United States Patent [19]

Arnold, III

[11] 4,205,367
[45] May 27, 1980

[54] CIGARETTE LIGHTER HOLDER AND ADAPTER

[75] Inventor: Benjamin L. Arnold, III, 6051 S. 42nd St., Phoenix, Ariz. 85040

[73] Assignee: Benjamin L. Arnold, III, Scottsdale, Ariz.

[21] Appl. No.: 848,589

[22] Filed: Nov. 4, 1977

[51] Int. Cl.² ............................................. F21V 33/00
[52] U.S. Cl. ......................................... 362/61; 362/95
[58] Field of Search ................. 362/80, 109, 119, 120; 180/90; 219/267; 248/27.1, 314

[56] References Cited

U.S. PATENT DOCUMENTS

| 2,692,938 | 10/1954 | Cone ..................................... 362/109 |
| 2,701,297 | 2/1955 | Thibault .............................. 362/109 |
| 3,454,742 | 8/1969 | O'Brian ............................... 219/262 |

*Primary Examiner*—Samuel W. Engle
*Assistant Examiner*—Edward F. Miles
*Attorney, Agent, or Firm*—Lavalle D. Ptak

[57] ABSTRACT

A cigarette lighter holder is constructed to fit into a conventional motor vehicle cigarette lighter socket and is made of insulating material to hold a conventional butane gas lighter or the like in place for subsequent removal and use by the driver and passengers of the motor vehicle. A flared collar extends from the open end of the holder to cover the cigarette lighter socket edges, and a light bulb is placed in the collar to illuminate the opening and to indicate its location to users of the lighter held in the holder/adapter.

5 Claims, 6 Drawing Figures

CIGARETTE LIGHTER HOLDER AND ADAPTER

BACKGROUND OF THE INVENTION

Most modern motor vehicles, both automobiles and trucks, include as a standard piece of equipment, a dashboard mounted cigarette lighter which comprises a lighter socket with a removable "pop-out" electric heating element. When the heating element is pressed into the lighter socket from its normal carrying or storage position, it makes electrical contact with a terminal in the lighter socket to bring the heating element to an ignition temperature. Once ignition temperature is reached, the heating element pops out to a position where it then can be removed from the lighter and used in igniting a cigarette or cigar. This ignition is accomplished by bringing the heating element into physical contact with the end of the cigar or cigarette. This causes the tobacco and paper at the end of the cigarette or the tobacco at the end of the cigar to make direct physical contact with the heating coil; and often when the lighter element is pulled away from the cigarette, a chunk of burning tobacco is pulled away with it. Such chunks may fall away from the lighter element into the lap of the user or onto the seat of the car creating a serious fire and safety hazard.

Another serious safety hazard encountered with the electric "pop-out" lighter occurs when such a lighter is passed from one person to another in the vehicle. It is very hot and severe burns can and do result when a person accidentally touches the hot end of the lighter.

Another disadvantage of the conventional electric cigarette lighter is that it is difficult to use such a lighter to light a pipe because of the requirement of physical contact between the heating element of the lighter and the tobacco in the pipe bowl. Furthermore, automobile cigarette lighters cannot be removed from the automobile and used when the automobile operator or passenger leaves the vehicle. In such an event, it is necessary for a smoker to have another lighter or to carry matches for use in lighting cigarettes when he is away from the motor vehicle.

It is desirable to provide an improved cigarette lighter arrangement for use with motor vehicles and more particularly a cigarette lighter holder adapter which will fit into the standard cigarette lighter socket but holds a conventional butane gas cigarette lighter or the like in a position of ready access for the user of the lighter.

SUMMARY OF THE INVENTION

Accordingly, it is an object of this invention to provide an improved cigarette lighter holder/adapter for a motor vehicle.

It is another object of this invention to provide an improved cigarette lighter holder/adapter for use with the cigarette lighter socket of a motor vehicle.

It is an additional object of this invention to provide an improved cigarette lighter holder/adapter for holding a pocket cigarette lighter in place in the motor vehicle for subsequent withdrawal and use.

It is a further object of this invention to provide an improved cigarette lighter adapter with illumination to assist users in locating its position in the dark.

In accordance with a preferred embodiment of this invention, a cigarette lighter holder and adapter for use in a motor vehicle comprises a generally cylindrically shaped housing member made at least in part of insulating material to electrically insulate its interior from its exterior. The housing member is open at one end for insertion into the cigarette lighter socket normally located in the dashboard of a motor vehicle. A flared collar is attached to the open end of the housing member which extends beyond the edge of the socket and the collar is flared radially outwardly and back toward the dashboard of the automobile to overlie and conceal the edge of the cigarette lighter socket aperture. The opening in the housing member is selected to be large enough to hold a removable cigarette lighter in it.

In a more specific embodiment of the invention, a light bulb is located in the collar and is electrically connected with contacts on the housing member which in turn engage the electrical contacts of the cigarette lighter socket to energize the bulb to facilitate location of the open end of the housing member in the dark.

DETAILED DESCRIPTION OF THE PREFERRED EMBODIMENT

Figure 1:
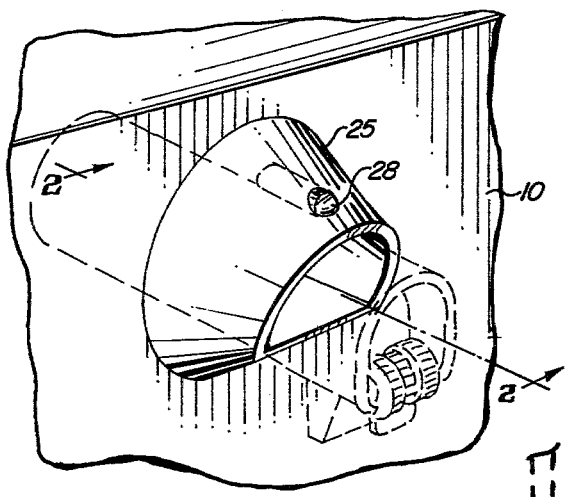
FIG. 1 is a perspective view of a preferred embodiment of the cigarette lighter holder/adapter in place in the dashboard of a motor vehicle.
Figure 2:
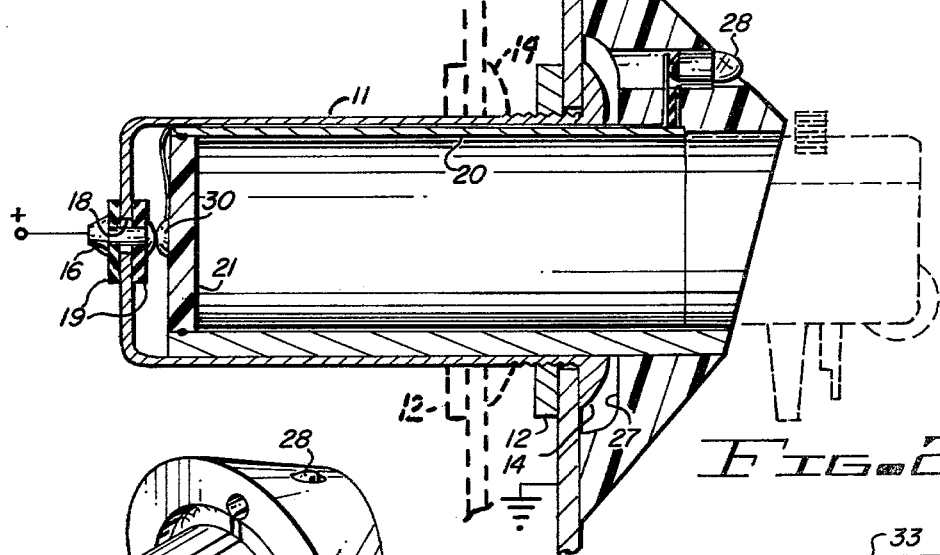
FIG. 2 is a cross sectional view of the embodiment shown in FIG. 1 taken along the lines 2—2.
Figure 3:
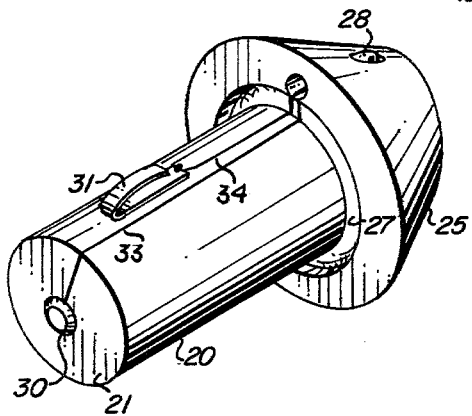
FIG. 3 is a perspective view of the reverse side of the embodiment shown in FIG. 1 illustrating details of the construction of such embodiment.

Referring now to the drawings, the same reference numbers are used throughout the different figures to designate the same or similar components. Reference first should be made to FIGS. 1, 2 and 3 which show a conventional automobile or truck dashboard 10 in which a conventional cigarette lighter socket 11 is mounted by means of a retaining nut 12 threaded onto it from the reverse side of the dashboard 10, as shown most clearly in FIG. 2. The outside edge of such a cigarette lighter socket 11 has a flange 14 on it to engage the outer edge of the dashboard 10 around the aperture which is cut into the dashboard to accommodate the socket 11. The socket 11 normally is made of metal or other suitable electrically conducting material which is electrically connected to vehicle ground, as indicated in FIG. 2 by the ground connection shown attached to the lower portion of the segment of the dashboard 10 illustrated in FIG. 2.

A positive electrical terminal 16 is placed in the base of the lighter socket 11 and conveniently is in the form of a rivet passing through an aperture 18 and a pair of insulating washers 19 which serve to insulate the contact 16 from the conductive outer casing 11 of the lighter socket. The manner in which the electrical terminal 16 is attached to, and electrically insulated from, the socket 11 is not important; but the structure shown in FIG. 2 is one which can be used to attach the positive terminal 16 into the base of the socket 11.

In utilizing the lighter socket 11 with the various embodiments of this invention, the conventional pop-out cigarette lighter element is removed from the socket. Then a lighter housing member in the form of an adapter sleeve 20 is inserted into the socket as shown most clearly in FIG. 2. This sleeve 20 preferably is made of rigid nonconductive molded plastic material having a generally circular cylindrical external cross section which conforms to the inside of the cigarette lighter socket 11.

As illustrated most clearly in FIGS. 1 and 2, the interior of the sleeve 20 may have a flat portion on its bottom to conform it to a popular shape of small pocket butane gas cigarette lighters currently being marketed. Of course the internal configuration of the adapter 20 could be in a form to accommodate any external shape of a cigarette lighter which has a maximum external cross section less than the maximum internal diameter which can be obtained in the adapter sleeve 20. The flattened portion of the interior of the sleeve 20 at its bottom is represented in FIG. 2 by the thickened wall on the bottom of the sleeve 20, as evidenced from an examination of the cross sections of the sleeve shown in FIG. 2.

At the end of the sleeve 20 which is inserted into the cigarette lighter socket 11, an insulating disc base 21 forms a nonconductive enclosure for a cigarette lighter (such as shown in dotted lines in FIGS. 1 and 2) thereby preventing the lighter from making electrical contact with any portion of the cigarette lighter socket 11. Since the conventional butane gas cigarette lighters are longer than the normal depth of the lighter socket 11, the cigarette lighter placed in the sleeve 20 extends beyond the dashboard surface a considerable amount, as is shown most clearly in FIG. 2. As a consequence, the sleeve 20 also is made to extend beyond the front edge of the dashboard 10, and a resilient collar 25 is attached to the adapter sleeve 20 adjacent its open end. This collar is flared outwardly and back toward the dashboard 10 to overlie the flange 14 and to snugly engage the surface of the dashboard 10.

Alternatively, the open end of the sleeve 20 (for some lighter shapes) may extend beyond the dashboard 10 farther than the solid line position shown in FIG. 2, leaving a space between the dashboard 10 and the back side of the collar 25. This is illustrated by the dotted line position of the dashboard 10 in FIG. 2. This arrangement permits the rear of the collar 25 to be grasped so that the sleeve 20 and lighter may be removed from the socket 11 as a unit.

Suitable materials out of which the collar 25 may be made include rubber or various types of commercially available plastics which exhibit the desired characteristics. The collar 25 is attached to the adapter sleeve 20 in any suitable manner, such as by using an adhesive or by placing flanges on the open end of the adapter sleeve 20 to accommodate a corresponding ridge or indentation on the interior surface of the collar 25. As shown most clearly in FIGS. 2 and 3, the collar 25 has a recess 27 formed on its inner surface adjacent the external surface of the adapter sleeve 20 to provide clearance for the flange 14 of the cigarette lighter socket 11 when the collar 25 is used with the solid line configuration shown in FIG. 2.

The opening in the collar 25 is made to conform generally to the shape of the cigarette lighter to be inserted into it and may be varied to accommodate lighters of different shapes. This opening also is made to engage the outside of a lighter placed into the adapter holder sleeve 20; so that the lighter is held in place and does not fall out due to jarring encountered when the motor vehicle is in use. To facilitate the removal of a lighter from the adapter sleeve, the collar 25 has the opening in it formed at an angle sloping downwardly toward the dashboard 10 from the top, as shown in FIGS. 1 and 2. The sloping undersurface of the collar 25 guides the fingers of the user of the lighter into engagement with the projections on the lighter when the user reaches for the lighter without looking at it. This frequently occurs when the user is the driver of the automobile, who must keep his eyes on the road ahead.

Often an automobile is used at night, and it is difficult to locate the position of the cigarette lighter on the dashboard in the dark. To overcome this difficulty, a light bulb 28 is mounted in the collar 25 immediately above the opening, as shown in FIGS. 1 and 2. Electrical contacts for the bulb 28 are provided by a contact 30, which is attached to the end 21 of the adapter sleeve, and a spring contact 31 attached to the side of the adapter sleeve 20. The spring contact 31 also functions to hold the sleeve 20 firmly in place in the cigarette light socket 11. Conductive wires 33 and 34 then are embedded in the plastic material forming the adapter sleeve 20 to terminate at contact points for engagement by the bulb 28. This is accomplished in a conventional manner.

Figure 4:
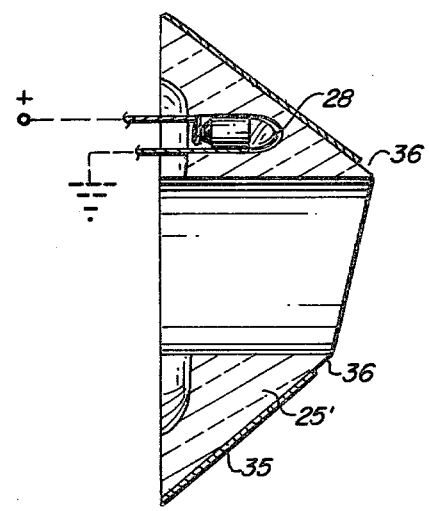
FIGS. 4 and 5 illustrate details of an alternative construction of a portion of the embodiment shown in FIGS. 1 through 3.
Figure 5:
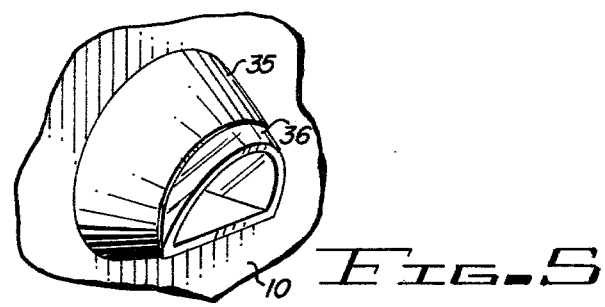

Using a bulb 28 in the structure shown in FIGS. 1 and 2 results in a small light directly above the opening in the adapter sleeve. It may be desirable, however, to provide a ring of light around the opening in the collar 25, outlining the opening, to further facilitate location of the opening in the dark, both for the removal of a lighter from the adapter and to guide the user in the insertion of a cigarette lighter back into the adapter when its use no longer is desired. To accomplish this, the collar 25 may be made of translucent or transparent plastic 25' as shown in FIGS. 4 and 5. The inner edge of the collar 25' then may be provided with a resilient rubber or neoprine washer (not shown) to fit against the dashboard of the automobile 10 to cause the collar 25 to fit tightly against the dashboard 10 and to accommodate any irregularities in it or in the collar 25' when the solid line version of the structure of FIG. 2 is used. For the alternative construction, shown by the dotted line location of the dashboard 10 in FIG. 2, the resilient washer is not needed. In all other respects, the collar 25' is constructed in the same shape as the collar 25 described previously.

In the construction of FIG. 4, however, the bulb 28 terminates inside the collar 25' and does not extend out of it as it does in the embodiments shown in FIGS. 1 and 2. The entire collar 25' may be permitted to pass light presenting a soft glow over the opening in the adapter sleeve, or the collar 25' may be covered over the major portion of its surface with an opaque coating 35 which may be in the form of paint, a plastic sleeve or the like. The coating 35 terminates just short of the opening in the end of the collar 25 to leave an area or ring of clear plastic 36, shown most clearly in FIG. 5. Then when the bulb 28 is illuminated, this clear plastic area 36 forms a ring of light around the opening.

The light bulb 28 in the embodiments described above is always illuminated, so long as the adapter 20 is firmly in the cigarette lighter socket 11. This condition may be considered undesirable in some cases since it presents a constant drain on the battery of the motor vehicle, including the times when the vehicle is not in operation. A bulb 28 can be used which consumes a minute amount of electricity; so that this is not a problem from a practical point of view, even if the automobile is not used for a period of several days. However, some users may object to the constant illumination of the light bulb 28. In such an event, the alternative embodiment of FIG. 6 may be used.

Figure 6:
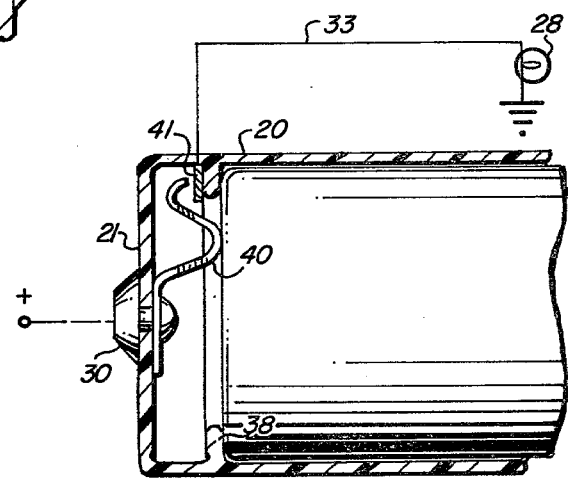
FIG. 6 illustrates an alternative construction of a switch which can be substituted for the arrangements shown in the embodiments of FIGS. 2 and 3.

In FIG. 6 the left-hand or closed end of the adapter 20 is provided with an inwardly turned flange 38 spaced a short distance from the end 21. The contact 30 then is formed entirely through the end 21 to extend into the space within the end of the sleeve 20, and a spring contact 40 is connected at one end to the contact 30. Typically, the contact 30 may comprise a rivet contact assembly similar to the assembly for the contact in the base of the lighter socket 11 described previously. The spring 40 has a bend or a bight in it which extends to the right beyond the edges of the flanges 38; so that its other end normally engages a mating contact 41 connected to the circuit for the light bulb 28. Thus, whenever the lighter is withdrawn from the adapter 20, the spring 40 engages the contact 41 and the light bulb 28 is illuminated. This light bulb can be used in either of the embodiments which have been described previously since its energization is not dependent upon the particular embodiment in which it is used.

When the lighter then is inserted back into the adapter 20 and is pressed against the flange 38, the lighter pushes the bight in the spring contact 40 to the left and causes it to break the circuit to the bulb 28, thereby turning off the bulb. Thus, so long as the lighter is in place in the adapter 20, the bulb 28 is off.

If on the other hand, it is considered desirable to have the bulb on when the lighter is in the adapter and to have the bulb 28 turned off when the lighter is removed, a simple reversal of the switch contacts 40 and 41 to accomplish this purpose can be made utilizing the principles illustrated in FIG. 6.

While the foregoing description has been directed to an insert adapter sleeve 20 made of nonconductive plastic, it is apparent that other constructions could be used if desirable. For example, if a metallic sleeve were utilized, an insulating base 21 could be placed in the sleeve, so that electrical contact could still be made in the manner described above. Then an insulating lining could be coated on the inside of the metallic sleeve so that no electrical contact would be made between the sleeve and any metal parts on the cigarette lighter itself. It may be desirable to utilize this latter type of construction for structural rigidity in order to obtain the thinnest possible wall thickness for the adapter sleeve 20 for situations where a maximum diameter of the adapter is necessary to accommodate a particular cigarette lighter shape. Various other modifications will occur to those skilled in the art without departing from the true scope of the invention as defined in the following claims.

I claim:

1. A cigarette lighter holder and adapter for use in a motor vehicle having a dash board with a conventional motor vehicle electric cigarette lighter socket in the dash board, said holder and adapter including in combination:
   a generally cylindrically shaped housing member, open at one end, for insertion into the electric cigarette lighter socket in the dash board of the motor vehicle, said housing member made at least in part of electrically insulating material for electrically isolating the interior thereof from the exterior thereof;
   electrical contact means in the other end of said cylindrically shaped housing member opposite said one end for making electrical contact with an electrical terminal in said cigarette lighter socket;
   an outwardly flared collar attached to said one end of said housing member overlying te edge of the cigarette lighter socket; and
   electrical illumination means in said collar electrically connected with said electrical contact means in said housing member for energization thereby;
   whereby a non electric cigarette lighter may be removably placed in said housing member.

2. The combination according to claim 1 wherein said illumination means comprises a light bulb located in said flared collar adjacent the opening in said one end of said housing member.

3. The combination according to claim 2 wherein said collar is fabricated at least in part of translucent plastic material and said light bulb is located in said translucent collar, which thereby disperses the light emanating from said bulb throughout an area of said collar which is greater than the area of said bulb.

4. The combination according to claim 3 wherein the outer surface of said collar is made opaque, with the exception of a predetermined area adjacent the opening at said one end of said housing member; so that the nonopaque area of said collar serves to illuminate and define such opening.

5. The combination according to claim 2 further including switch means located in said housing member and connected in series circuit between said contact means and said illumination means for operation by the insertion of a cigarette lighter into said housing member to one of two states and for operation to the other of two states when the lighter is removed from said housing member.

* * * * *